United States Patent
Azais et al.

(10) Patent No.: US 8,749,952 B2
(45) Date of Patent: Jun. 10, 2014

(54) MULTIPLE-COIL SUPERCAPACITOR

(75) Inventors: Philippe Azais, Quimper (FR); Olivier Caumont, Quimper (FR); Jean-Michel Depond, Quimper (FR)

(73) Assignee: Batscap, Ergue Gaberic (FR)

( * ) Notice: Subject to any disclaimer, the term of this patent is extended or adjusted under 35 U.S.C. 154(b) by 916 days.

(21) Appl. No.: 12/918,053

(22) PCT Filed: Feb. 12, 2009

(86) PCT No.: PCT/EP2009/051665
§ 371 (c)(1),
(2), (4) Date: Nov. 10, 2010

(87) PCT Pub. No.: WO2009/103660
PCT Pub. Date: Aug. 27, 2009

(65) Prior Publication Data
US 2011/0043962 A1    Feb. 24, 2011

(30) Foreign Application Priority Data

Feb. 19, 2008 (FR) ...................... 08 51056

(51) Int. Cl.
*H01G 9/00* (2006.01)
*H01G 9/02* (2006.01)
*H01G 4/00* (2006.01)

(52) U.S. Cl.
USPC ........... 361/502; 361/511; 361/512; 361/513; 29/25.03

(58) Field of Classification Search
USPC ............... 361/301.5, 502, 511–513; 29/25.03
See application file for complete search history.

(56) References Cited

U.S. PATENT DOCUMENTS

| | | | | |
|---|---|---|---|---|
| 2,505,545 A | * | 4/1950 | Hopkins et al. | 361/324 |
| 2,949,570 A | * | 8/1960 | Rayburn | 361/330 |
| 3,106,671 A | * | 10/1963 | Coleman et al. | 361/302 |
| 3,292,063 A | * | 12/1966 | Kellerman | 361/330 |
| 3,622,843 A | * | 11/1971 | Vermilyea et al. | 361/504 |

(Continued)

FOREIGN PATENT DOCUMENTS

| | | |
|---|---|---|
| CH | 84 526 A | 7/1920 |
| DE | 328 592 C | 10/1920 |

(Continued)

OTHER PUBLICATIONS

Zhu et al., Chemical and electrochemical ageing of carbon materials used in supercapacitor electrodes, Nov. 2008, pp. 1829-1840, Carbon 46, issue 14.

(Continued)

*Primary Examiner* — Bradley Thomas
(74) *Attorney, Agent, or Firm* — Blakely Sokoloff Taylor & Zafman

(57) ABSTRACT

The invention relates to a supercapacitor with a double electrochemical layer that comprises at least two complexes (2, 3) and at least one spacer (4) between the two complexes (2, 3), the complexes (2, 3) and the spacer (4) being spirally wound together in order to form a coiled member (10), characterized in that it further comprises at least another complex (1) and at least another spacer (4), the other complex (1) and the other spacer (4) being spirally wound together around the coiled member (10) in order to form at least one subsequent coiled member (20), the consecutive coiled members (10, 20) being separated by an electronic insulation space.

36 Claims, 9 Drawing Sheets

(56) References Cited

U.S. PATENT DOCUMENTS

Figure 1A:
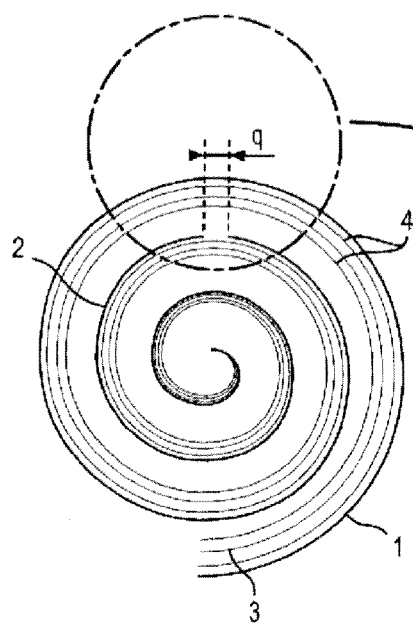

| | | | |
|---|---|---|---|
| 4,051,304 A * | 9/1977 | Snook | 429/94 |
| 4,327,395 A * | 4/1982 | Yagitani et al. | 361/326 |
| 4,638,402 A * | 1/1987 | Lim et al. | 361/328 |
| 5,047,300 A * | 9/1991 | Juergens | 429/94 |
| 5,453,906 A * | 9/1995 | Doll | 361/273 |
| 6,021,039 A * | 2/2000 | Inagawa | 361/502 |
| 6,031,711 A * | 2/2000 | Tennent et al. | 361/303 |
| 6,094,788 A * | 8/2000 | Farahmandi et al. | 29/25.41 |
| 6,215,278 B1 * | 4/2001 | Okamura et al. | 320/119 |
| 6,246,568 B1 * | 6/2001 | Nakao et al. | 361/502 |
| 6,315,918 B1 * | 11/2001 | Mita et al. | 252/62.2 |
| 6,366,445 B1 * | 4/2002 | Bruvelaitis et al. | 361/511 |
| 6,414,836 B1 * | 7/2002 | Tennent et al. | 361/313 |
| 6,456,484 B1 * | 9/2002 | Matsuoka et al. | 361/511 |
| 6,510,043 B1 * | 1/2003 | Shiue et al. | 361/502 |
| 6,534,212 B1 * | 3/2003 | Hooke | 429/94 |
| 6,579,327 B1 * | 6/2003 | Shiue et al. | 29/25.03 |
| 6,639,786 B2 * | 10/2003 | Noguchi et al. | 361/502 |
| 6,762,926 B1 * | 7/2004 | Shiue et al. | 361/502 |
| 6,765,785 B2 * | 7/2004 | Honda et al. | 361/525 |
| 6,831,826 B2 * | 12/2004 | Iwaida et al. | 361/502 |
| 6,954,249 B2 * | 10/2005 | Muramatsu et al. | 349/149 |
| 7,054,139 B2 * | 5/2006 | James et al. | 361/512 |
| 7,145,763 B2 * | 12/2006 | Kim et al. | 361/502 |
| 7,177,139 B2 * | 2/2007 | Oizumi | 361/502 |
| 7,462,418 B2 * | 12/2008 | Matsumoto | 429/94 |
| 7,492,574 B2 * | 2/2009 | Fresard et al. | 361/517 |
| 7,768,770 B2 * | 8/2010 | Kang et al. | 361/502 |
| 7,859,826 B2 * | 12/2010 | Thrap et al. | 361/502 |
| 7,881,043 B2 * | 2/2011 | Hirose et al. | 361/502 |
| 7,920,371 B2 * | 4/2011 | Mitchell et al. | 361/502 |
| 7,983,021 B2 * | 7/2011 | Reddy et al. | 361/502 |
| 2002/0039275 A1 * | 4/2002 | Takeuchi et al. | 361/504 |
| 2002/0089814 A1 * | 7/2002 | Noguchi et al. | 361/511 |
| 2003/0026063 A1 * | 2/2003 | Munshi | 361/503 |
| 2003/0030963 A1 * | 2/2003 | Tennent et al. | 361/504 |
| 2004/0179328 A1 * | 9/2004 | Ando et al. | 361/504 |
| 2006/0098389 A1 * | 5/2006 | Liu et al. | 361/502 |
| 2006/0221551 A1 | 10/2006 | Kim et al. | |
| 2006/0263649 A1 * | 11/2006 | Sohn | 429/7 |
| 2007/0146965 A1 * | 6/2007 | Mitchell et al. | 361/502 |
| 2007/0183120 A1 * | 8/2007 | Fujimoto et al. | 361/528 |
| 2007/0195486 A1 * | 8/2007 | Paul et al. | 361/502 |
| 2010/0227209 A1 * | 9/2010 | Kim | 429/94 |
| 2010/0246095 A1 * | 9/2010 | Ohashi et al. | 361/502 |
| 2011/0242731 A1 * | 10/2011 | Fleischer et al. | 361/502 |
| 2012/0034500 A1 * | 2/2012 | Kaun | 429/61 |

FOREIGN PATENT DOCUMENTS

| | | | | |
|---|---|---|---|---|
| EP | 0 109 100 A1 | 5/1984 | | |
| EP | 0 786 786 A1 | 7/1997 | | |
| EP | 1 471 545 A1 | 10/2004 | | |
| EP | 1 801 825 A1 | 6/2007 | | |
| FR | 848 360 | 10/1939 | | |
| FR | 1 526 673 | 5/1968 | | |
| FR | 2 457 004 | 12/1980 | | |
| GB | 306517 | 6/1930 | | |
| GB | 381017 | 9/1932 | | |
| GB | 846083 | 8/1960 | | |
| GB | 909350 | 10/1962 | | |
| GB | 1 220 567 | 1/1971 | | |
| GB | 2111749 A | * | 7/1983 | H01G 4/32 |
| JP | 09-092338 | 4/1997 | | |
| WO | WO 98/15962 | 4/1998 | | |
| WO | WO 2004/075320 A2 | 9/2004 | | |

OTHER PUBLICATIONS

Azais, Causes of ageing of supercapacitors based on activated carbon electrodes and organic electrolyte, PhD dissertation, 2003, Orléans, France.

Azais et al., Causes of supercapacitors ageing in organic electrolyte, Journal of Power Sources 171, Jul. 2007, pp. 1046-1053.

Hahn et al., Gas evolution in activated carbon/propylene carbonate based double-layer capacitors, Electrochemistry Communications 7, Aug. 2005, pp. 925-930.

Kotz et al., Principles and applications of electrochemical capacitors, Electrochimica Acta 45, 2000, pp. 2483-2498.

* cited by examiner

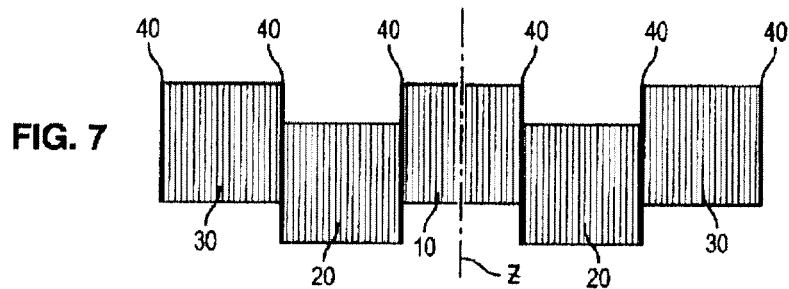
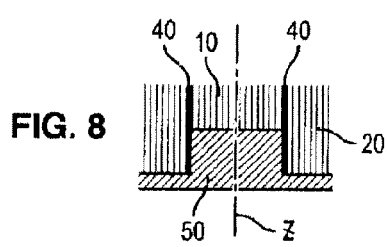
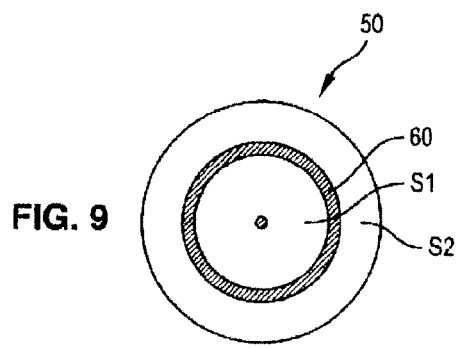
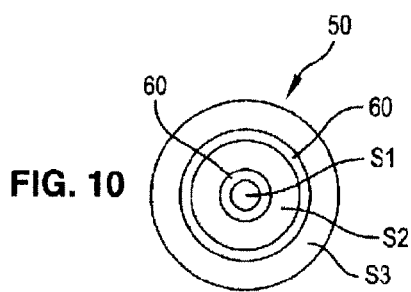
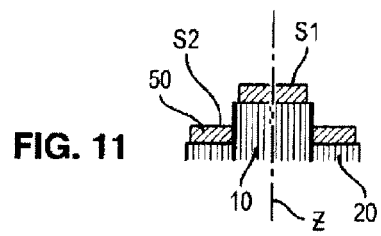
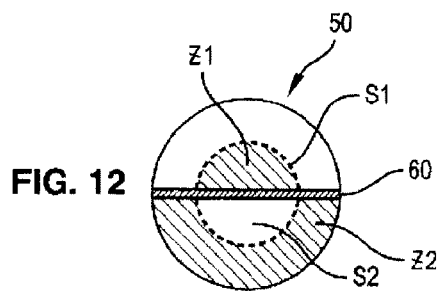
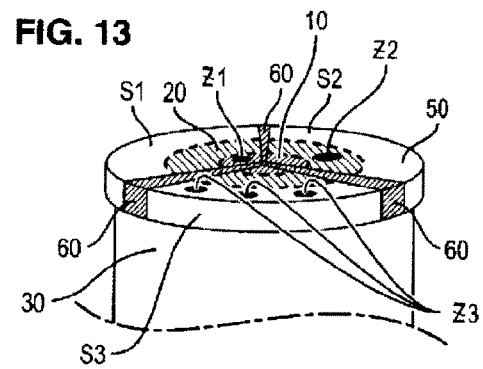

FIG. 14
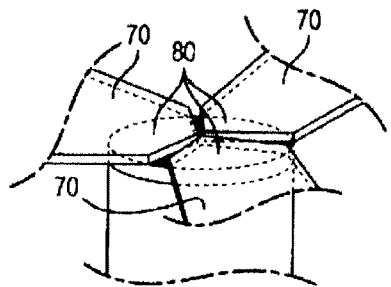
FIG. 15 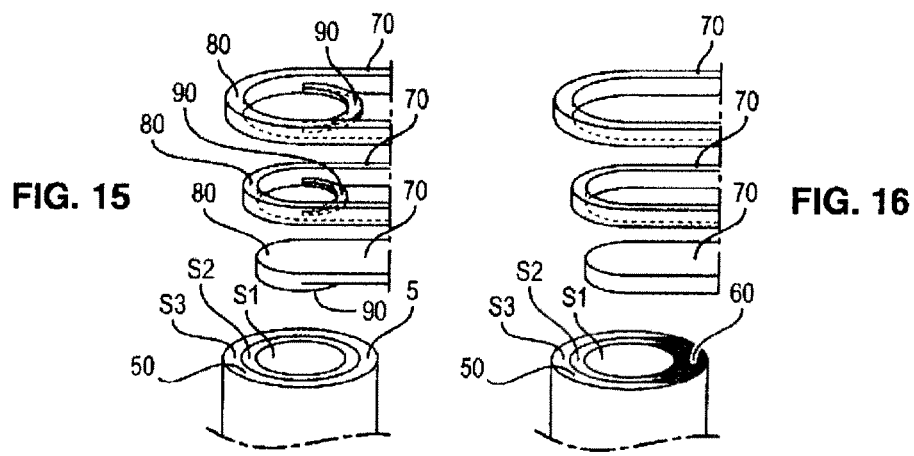 FIG. 16
FIG. 17
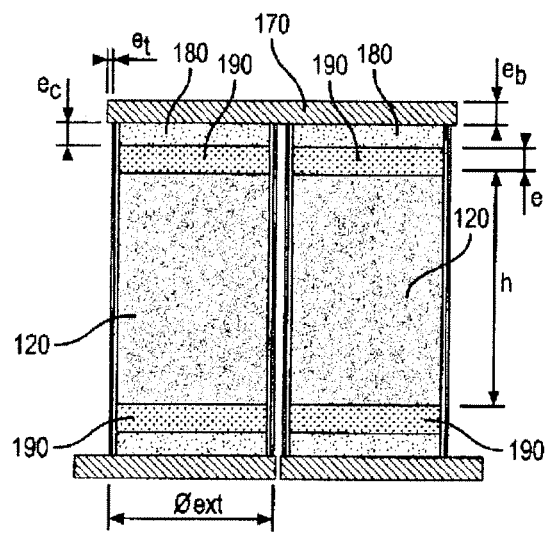

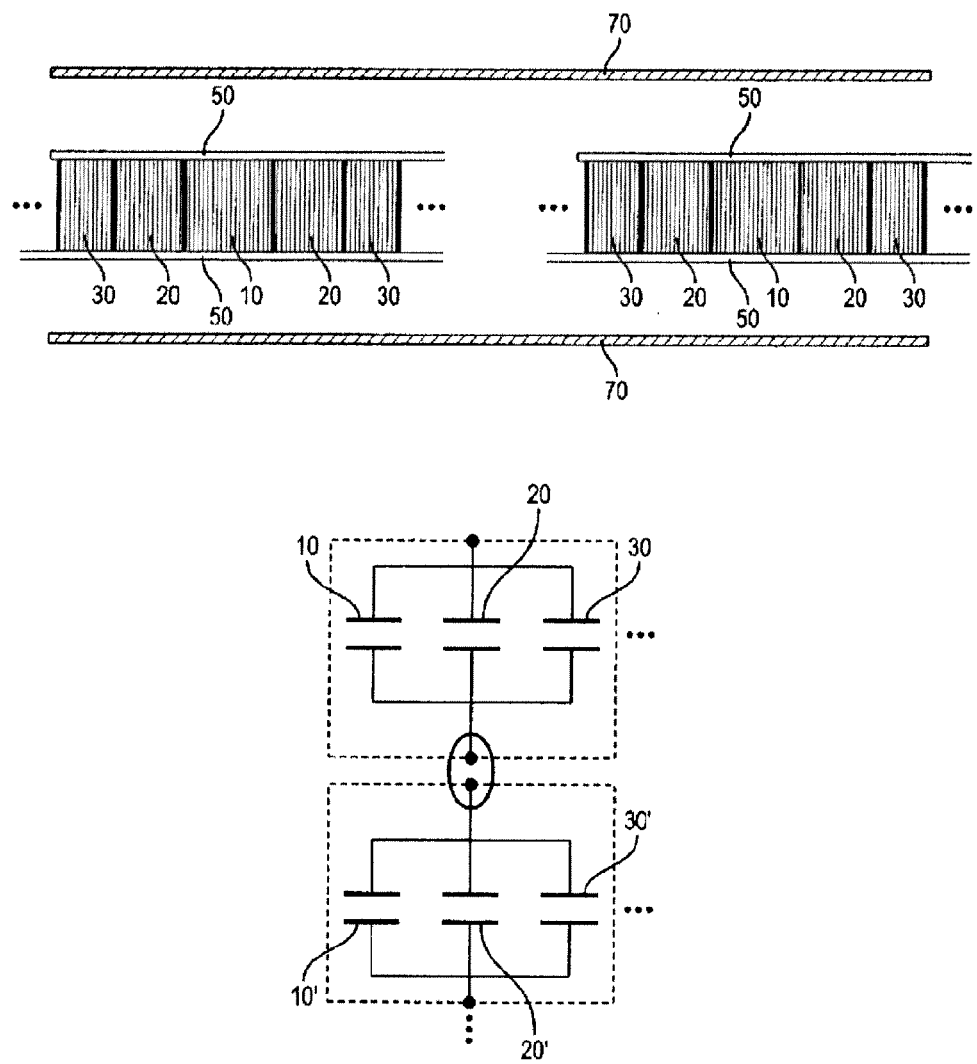

MULTIPLE-COIL SUPERCAPACITOR

This is a non-provisional application claiming the benefit of International application number PCT/EP2009/051665 filed Feb. 12, 2009.

The present invention relates to the general technical field of supercapacitors, i.e. capacitors with a double electrochemical layer (or EDLC acronym of "Electrochemical Double Layer Capacitor").

GENERAL PRESENTATION OF THE PRIOR ART

A supercapacitor is a means for storing energy with which it is possible to obtain a power density and an intermediate energy density between those of dielectric capacitors and batteries. Their discharge time is generally of the order of a few seconds.

A supercapacitor conventionally comprises a cylindrical wound element comprising at least two electrodes. Each electrode is made from a mixture of active coal (also called "active material"), of carbon black and polymers. During a so-called extrusion step, a conductive paste is deposited on an aluminium collector which is used as a current collector. Both electrodes are separated by a porous separator in order to avoid short-circuits between both electrodes. During a so-called impregnation step, the supercapacitor is filled with an electrolyte. This electrolyte consists of a salt dissolved in a solvent, generally acetonitrile. This salt is separated into two charged species which are called ions (for example: $BF_4^-$ and $TEA^+$).

The thickness of an electrode is typically 100 µm. The ions have a size of the order of $1/1000^{th}$ of a µm, i.e. 100,000 times smaller than the thickness of the electrode. Active coal (or active material) is an extremely porous material.

When a voltage is applied with a DC generator between two electrodes of the supercapacitor, the ions move in the porosity very close to the surface of the coal. The greater the amount of ions present at the surface of coal, the larger is the capacitance.

The amount of energy stored in a supercapacitor depends on the voltage applied between both electrodes and on the total capacitance of the supercapacitor.

Many investigations have shown that the higher the operating voltage of the supercapacitors, the shorter is the lifetime, because of very large generation of gas in the supercapacitor.

This gas generation is related to the decomposition of the material forming the electrolyte, this decomposition being a function of the applied voltage between the electrodes of the supercapacitor.

For example, the decomposition voltage of pure acetonitrile is 5.9V.

Presently, the reference voltage applied to the electrodes of supercapacitors is 2.7V (see notably WO 9 815 962 which teaches to the person skilled in the art that the voltage of a supercapacitor should be limited in order not to degrade too much the electrolyte).

In order to remedy this drawback, it is known how to electrically connect several supercapacitors to each other in order to form a module. This allows an increase in the voltage applied to the module.

In order to electrically connect two adjacent supercapacitors, connection means comprising two lids and a strap are used.

Each lid is capable of capping a respective supercapacitor so as to be electrically connected to the latter, for example by soldering.

Each lid further comprises a connection terminal capable of coming into contact with a through-bore of the strap, so as to electrically connect both adjacent supercapacitors.

However, such supercapacitors have drawbacks.

Notably, the volume and the mass of two supercapacitors electrically connected through a strap and two lids are significant.

Moreover, the manufacturing cost related to the purchase and mounting of the straps and lids for connecting both supercapacitors is significant.

Also, the series resistance Rs between two electrically connected supercapacitors—which corresponds to the sum of the resistances of the supercapacitors and of the connection means (strap+lid+solder)—is significant.

The general object of the invention is to propose a supercapacitor, the lifetime of which is increased at the reference voltage.

Another object of the present invention is to propose a supercapacitor in which gas generation is limited.

Another object of the present invention is to propose a supercapacitor capable of supporting a voltage above the reference voltage without undergoing any degradation.

PRESENTATION OF THE INVENTION

For this purpose, a supercapacitor is provided comprising at least two electrodes and at least one separator between both electrodes, the electrodes and the separator being wound together in turns in order to form a wound element, the supercapacitor further comprising at least one other electrode and at least one other separator, the other electrode and the other separator being wound together in turns around the wound element so as to form at least one consecutive wound element, these successive wound elements being separated by an electronic insulating space.

"Complex" designates the association of a current collector and of at least one electrode, the current collector and the electrode having a common electrically conducting surface.

"Successive complexes" designate two coplanar complexes (before being wound in turns in order to form a wound element) and separated by an electronic insulating space of width d during their being wound.

"Common complex" designates any association of complexes in electronic continuity.

The separator(s) extend(s) beyond the electrodes of each complex facing each other but not beyond the collectors of the complexes being used as a connection to the outside.

Preferred but non-limiting aspects of the module according to the invention are the following:
- an electrode of the supercapacitor is common to two successive wound elements.
- the supercapacitor further comprises at least one second other electrode, the other electrodes and the other separator being wound together in turns around the wound element so as to form the consecutive wound element,
- the electronic insulating space is formed by a reinforcement formed with at least one turn of dielectric insulating material,
- the electronic insulating space is formed by a distance q separating at least one of the electrodes of the first wound element from at least one electrode of the second wound element,
- the distance q should be at least equal to 1 mm,
- the separators are continuous so that the supercapacitor includes a single separator common to the different wound elements and acting as a reinforcement between the different wound elements, the height of each wound element is constant,
the wound elements have different heights,
the wound elements are shifted relatively to each other along their longitudinal axis,
the wound elements are electrically connected through a first conducting lid over the whole of its surface, said lid being positioned on one of the base faces of the wound elements,
the first lid has an indented cross-section,
the first lid substantially extends in a plane,
the wound elements are electrically connected through a second conducting lid over the whole of its surface, said lid being positioned on the other of the base faces of the wound elements so as to connect the wound elements in parallel,
the wound elements are electrically connected through a second conducting lid comprising electrically conducting portions, the conducting portions being separated from each other by electrically insulating portions, each conducting portion respectively being in electric contact with a wound element so as to connect the wound elements in series,
one of the electrically conducting portions is disk-shaped, and the other electrically conducting portions are crown-shaped, the conducting portions being separated from each other by crown-shaped electrically insulating portions,
the second lid globally extends in a plane,
the second lid has an indented cross-section,
each conducting portion is in the shape of a disk portion, the disk portions being separated from each other by radial insulating portions,
the supercapacitor is connected to at least one other supercapacitor of the same type through at least two connecting straps, each connecting strap comprising an electrically conducting portion intended to respectively come into contact with a disk-shaped conducting portion of the lid,
the supercapacitor is electrically connected to another supercapacitor of the same type through at least one connecting strap comprising at least two electrically conducting portions insulated from each other by at least one electrically insulating portion, said conducting portions being intended to respectively come into contact with one conducting portion of the lid,
the connecting strap is substantially flat and in that the lid comprises electrically insulating areas extending at the contact surface between the lid and the strap, the electrically insulating areas being positioned so that each conducting portion of the strap is electrically in contact with a single conducting portion of the lid,
each electrically conducting portion comprises a protruding connection element at the ends of the connecting strap, each protruding element being intended to come into contact with a respective conducting portion of the lid,
the height of the reinforcement is comprised between the height of active material of the first wound element and the total height of said first wound element,
the electrodes of the wound elements are of different width and/or length,
the thicknesses of the electrodes of the wound elements are different
the electrodes of the wound elements are of different natures,
the base of the wound elements orthogonal to the winding axis is of circular shape,
the base of the wound elements orthogonal to the winding axis is of hexagonal shape,
the base of the wound element orthogonal to the winding axis is of triangular shape,
the base of the wound elements orthogonal to the winding axis is of octagonal shape,
the base of the wound elements orthogonal to the winding axis is of rectangular shape,
the angles of the wound elements are non-protruding,
the base of the wound elements orthogonal to the winding axis is of elliptical shape, The invention also relates to a module comprising a casing in which is positioned at least one supercapacitor as described above.

Advantageously, the module may both comprise supercapacitors according to the invention and supercapacitors of the prior art, as illustrated in FIG. 11. In other words, the module may further comprise a supercapacitor according to the invention, a standard supercapacitor comprising a cylindrical wound element including at least two electrodes and at least one separator wound together in turns in order to form a wound element positioned in a casing and lids intended to close the casing, this standard supercapacitor being electrically connected to a supercapacitor according to the invention via at least one connecting strap.

PRESENTATION OF THE FIGURES

Figure 18:
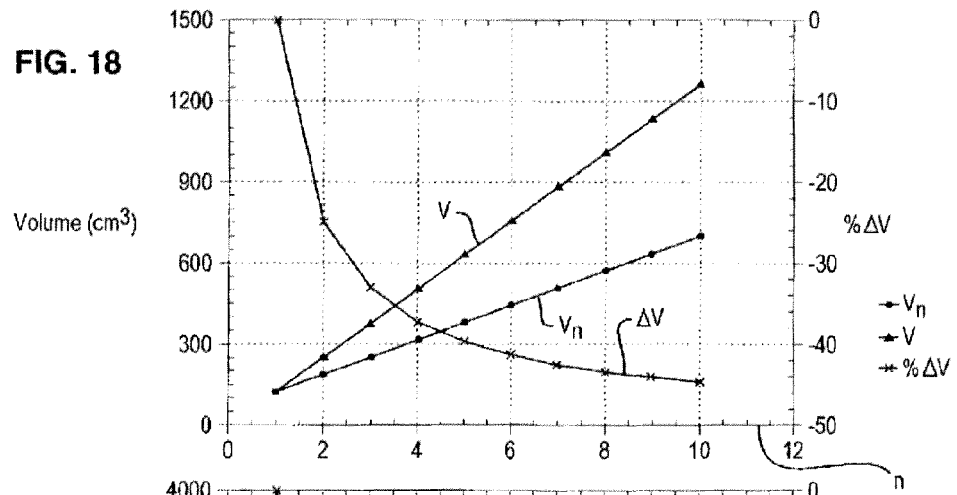
Figure 19:
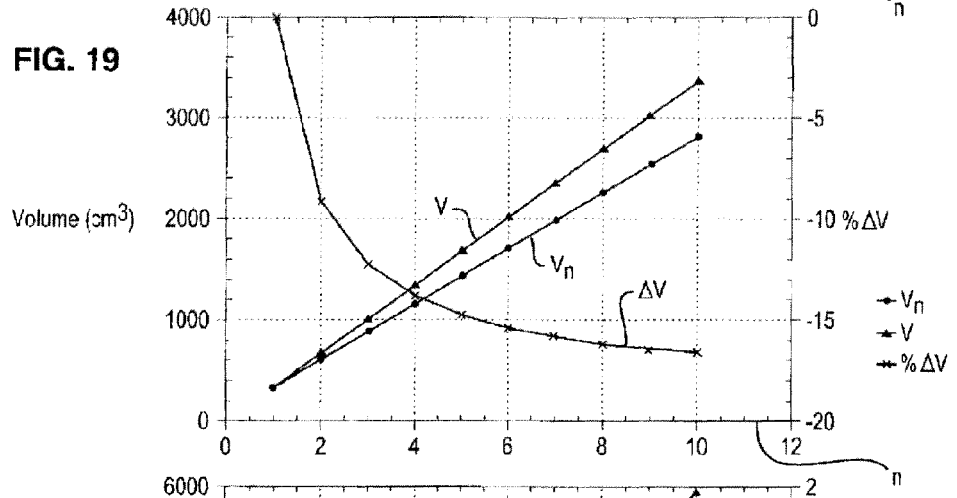
Figure 20:
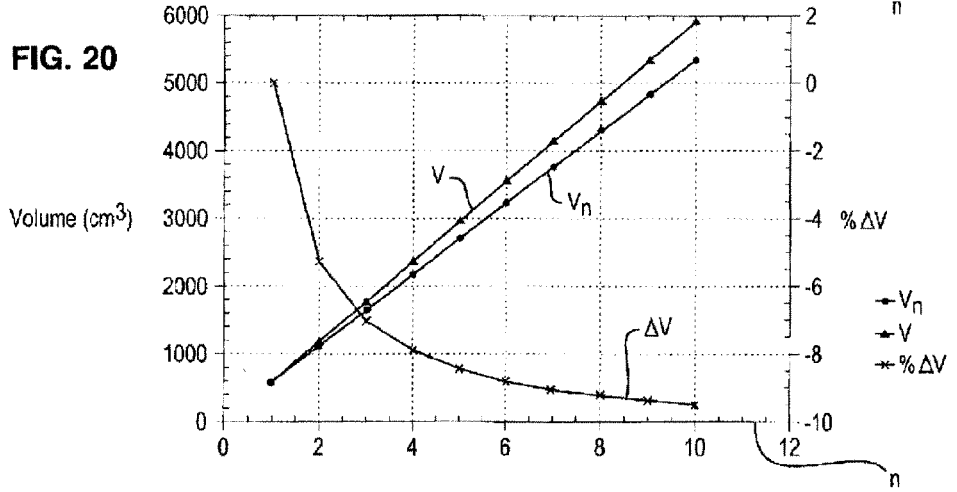
Figure 21:
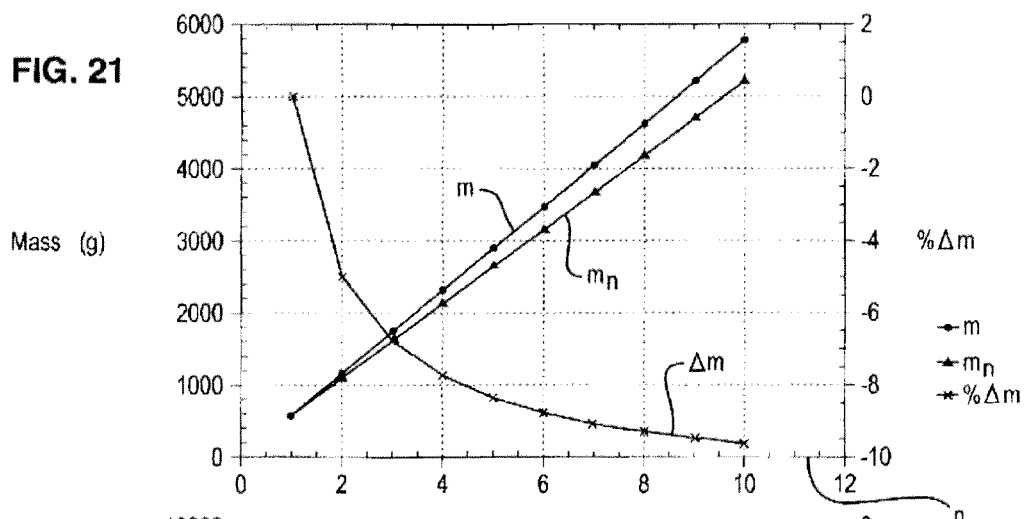
Figure 22:
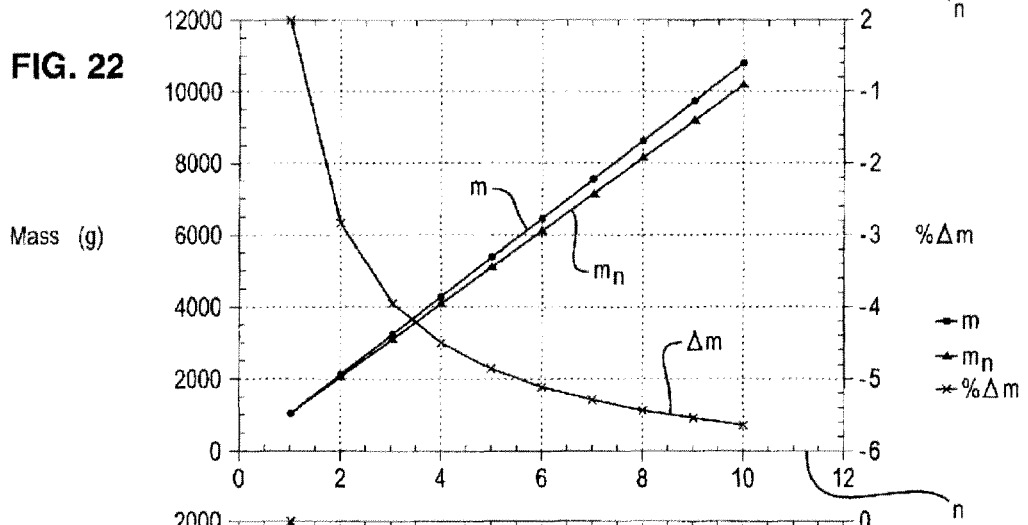
Figure 23:
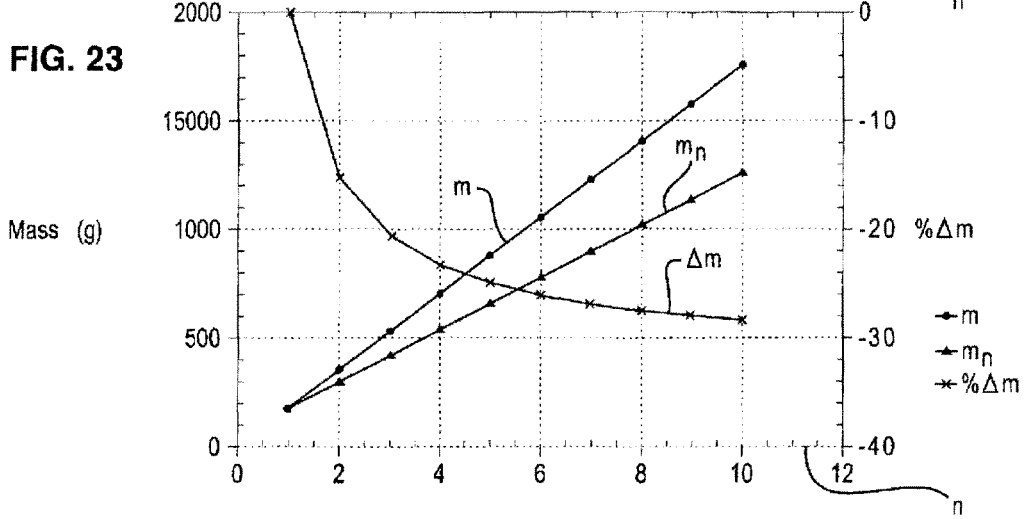

Other features, objects and advantages of the present invention will further become apparent from the description which follows, which is purely illustrative and non-limiting and should be read with reference to the appended drawings wherein:

FIGS. 1a-7 illustrate different embodiments of wound elements of a supercapacitor according to the invention, FIGS. 8-13 illustrate different embodiments of lids of the supercapacitor according to the invention, FIGS. 14-16 illustrate different embodiments of a connecting strap for connecting adjacent supercapacitors, FIG. 17 illustrates a supercapacitor of the prior art, FIGS. 18-20 are graphic illustrations illustrating the volume V of a supercapacitor versus the number of wound elements, FIGS. 21-23 are graphic illustrations illustrating the mass m of a supercapacitor versus the number of wound elements, FIGS. 24-28 illustrate different electric circuits which may be made with the supercapacitors according to the invention.

DESCRIPTION OF THE INVENTION

Different embodiments of the supercapacitor according to the invention will now be described with reference to FIGS. 1-23. In these different figures, equivalent elements of the supercapacitor bear the same numerical references.

Figure 1B:
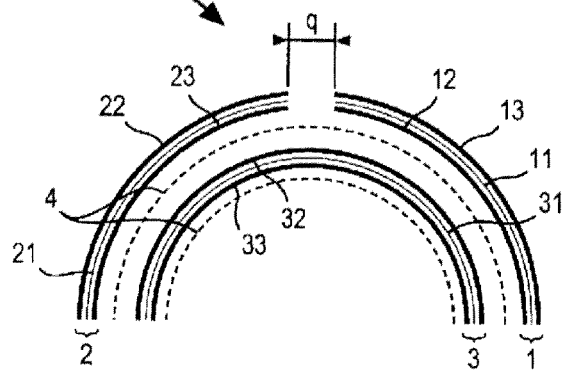

With reference to FIGS. 1a and 1b, a sectional view along a transverse axis of a first embodiment of the supercapacitor is illustrated.

The supercapacitor comprises two complexes 2, 3 positioned face to face and separated by a separator 4.

The complexes 2, 3 and the separator 4 are wound together in turns in order to form a first wound element.

The supercapacitor also comprises another complex 1 successive to one 2 of the complexes 2, 3 and another separator 4. The other electrode and the other separator are wound together in turns around the first wound element so as to form at least one second consecutive wound element.

The successive complexes 1, 2 are spaced apart by a distance q along a direction circumferential to the longitudinal axis of the supercapacitor.

Advantageously, the distance q between the successive complexes 1, 2 is provided to be sufficient in order to electrically insulate the successive complexes 1, 2 from each other. In the embodiment illustrated in FIG. 1, the distance q is larger than or equal to 1 millimeter.

A distance q of one millimeter is indeed sufficient in order to prevent the electric field generated between both successive complexes 1, 2 from being too large, which would risk decomposing the electrolytes under normal conditions of use of the supercapacitor.

The complex 3 positioned facing both successive complexes is a so-called "common complex".

With the separators 4, it is possible to electrically insulate the successive complexes 1, 2 of the common complex 3. One of the separators is positioned between the common complex 3 and the successive complexes 1, 2. The other separator 4 is positioned on the other face of the common complex 3 so that the common complex 3 is located between the separators 4.

Each complex 1, 2, 3 comprises a current collector 11, 21, 31 and at least one electrode consisting of active material, the electrode having an electrically conducting face in common with the current collector 11, 21, 31.

In the embodiment illustrated in FIGS. 1a and 1b, each complex 1, 2, 3 comprises two opposite electrodes 12, 13, 22, 23, 32, 33 on either side of the current collector 11, 21, 31. Each electrode 12, 13, 22, 23, 32, 33 has an electrically conducting surface in common with a respective face of the current collector 11, 21, 31.

The areas facing the successive and common complexes define two supercapacitor cells, the capacitances of which are determined by their respective lengths. The continuity of the common complex 3 allows both supercapacitor cells to be placed in series.

The complexes 1, 2, 3 and separators 4 respectively consist of one or more superposed sheets.

Advantageously, the successive complexes 1, 2, the common complex 3 and the separators 4 are successively wound together in turns, in order to form a consecutive first wound element and second wound element.

The proposed solution is less costly than the supercapacitors of the prior art described earlier. Indeed, the number of straps, lids and tubes (used as a housing for the wound elements) in order to electrically connect two supercapacitor cells is less than the number of straps, lids and tubes required for electric connection of several supercapacitors of the prior art.

Moreover, the proposed solution above allows a reduction in the series resistance Rs of the system (by the reduction of the number of lids and straps required for connecting the supercapacitor cells as compared with the number of lids and straps required for connecting supercapacitors of the prior art), and a significant increase in the admissible energy per unit volume while optimizing the capacitance.

With the supercapacitor described above, it is thus possible to obtain a compact wound structure:
- allowing series and parallel electric connections of supercapacitor cells with identical capacitances C, or of different capacitances C, C' operating at the same supply voltage Un with the purpose of increasing the global currents and/or voltage of the compact structure,
- meeting particular balancing requirements in an application (a triangle or star circuit of supercapacity cells of any capacitances operating at any voltages),
- allowing optimization of the energy and power bulk and mass densities of assemblies of supercapacitor cells of identical capacitance C operating at the same voltage Un.

Other advantages related to the removal of straps and lids for connecting two supercapacity cells in series/parallel are the following:
- reduction in the volume of the supercapacitor
- mass reduction as compared with two supercapacitors of the prior art connected in series,
- reduction in the volume of two supercapacitors connected in series/parallel: twice the volume of a supercapacitor of the prior art (obtained by winding together in turns two complexes and a separator) is larger than the volume of a supercapacitor according to the invention (obtained by winding together in turns three complexes and two separators) as illustrated in FIG. 1, therefore
- increase in the energy and power bulk and mass densities,
- non-reduction in the internal free volume as compared with a series association of supercapacitors of the prior art (standards),
- gain in time from a manufacturing method point of view (n cells in 1 single supercapacitor) by simplifying the manufacturing method, because of single winding, single impregnation, single heat treatment and single soldering.

Figure 2:
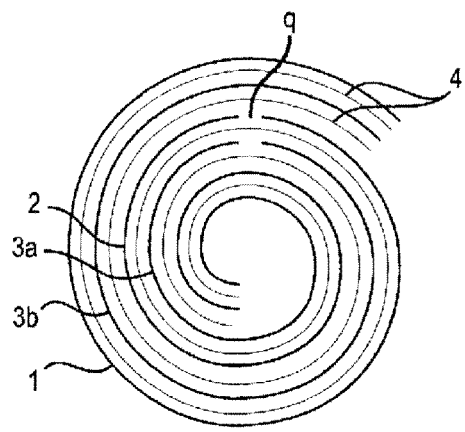

With reference to FIG. 2, another embodiment of the supercapacitor according to the invention is illustrated.

The supercapacitor illustrated in FIG. 2 differs from the supercapacitor illustrated in FIG. 1 in that it comprises four complexes instead of three.

Two first complexes 2, 3a are positioned face to face. One 2 of both first complexes is positioned between two separators 4. The first two complexes 2, 3a and the separators 4 are wound together in turns in order to form a first wound element.

Two other complexes 1, 3b are successive to the first two complexes 2, 3a and spaced apart (from the first two complexes) by a distance q along a direction circumferential to the supercapacitor.

Both complexes 1, 3b are wound together in turns around the first wound element consisting of the complexes 2, 3a so as to form at least one second consecutive wound element.

In this embodiment, each wound element forms an independent supercapacitor. The series or parallel electric connection of both thereby formed supercapacitors is ensured by the lids 50 as this will be described in more detail in the following.

Figure 3:
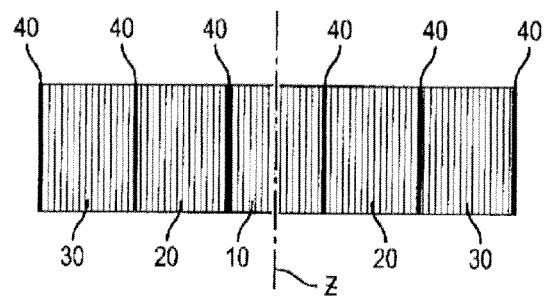

In FIG. 3 different wound elements 10, 20, 30 of a supercapacitor according to the invention are illustrated. The successive wound elements 10, 20, 30 are coaxial with an axis Z. These successive wound elements 10, 20, 30 are separated by an electronic insulating space. This electronic insulating space allows insulation of the wound elements from each other.

According to an alternative embodiment, the electronic insulating space is formed by a distance q separating two successive wound elements. Advantageously, this distance q is provided to be sufficient in order to prevent direct passage of the current between two successive wound elements. For example, the distance q may be greater than one millimeter.

According to another alternative embodiment, the electronic insulating space may be formed by a reinforcement 40 formed with at least one turn of dielectric insulating material. The use of a reinforcement for electrically separating two successive wound elements facilitates the making of the supercapacitor.

Advantageously, the height of the reinforcement is comprised between the height of active material of the first wound element and the total height of said first wound element.

Figure 4:
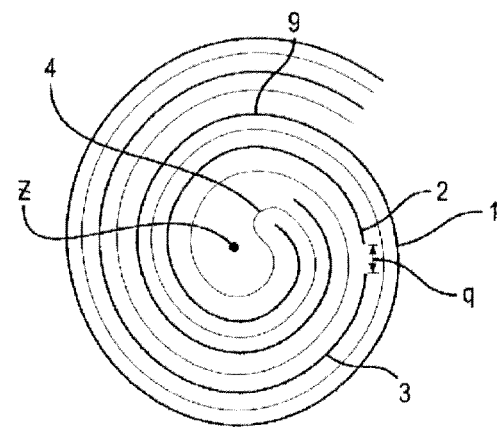

As illustrated in FIG. 4, the separators 4 may be continuous so that the supercapacitor includes a single separator 4 common to different wound elements and acting as a reinforcement between the successive wound elements.

In the embodiment illustrated in FIG. 3, the different wound elements 10, 20, 30 are of constant height. Moreover, the bases of the different wound elements 10, 20, 30 are coplanar. With this the winding of the successive wound elements may be facilitated.

Figure 5:
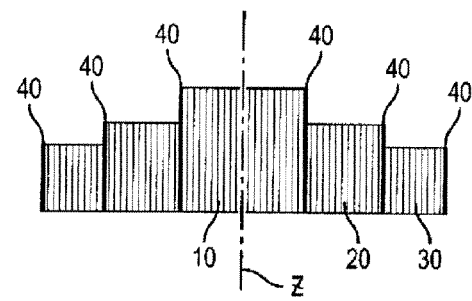

In other embodiments as illustrated in FIG. 5, the successive wound elements 10, 20, 30 are of different heights, the successive wound elements having a coplanar base.

Still in other embodiments, the successive wound elements 10, 20, 30 are of identical height, but their bases are shifted relatively to each other along their longitudinal axis. Such embodiments are illustrated in FIGS. 6 and 7.

Figure 6:
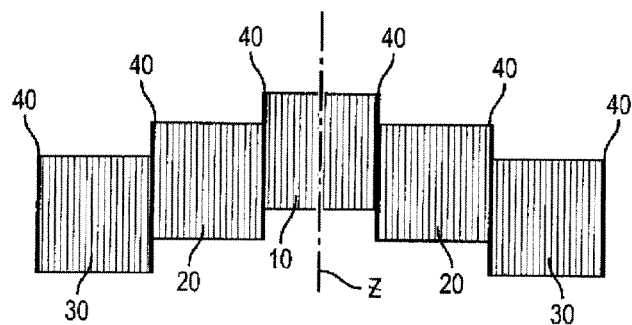

In the embodiment of FIG. 6, the successive wound elements 10, 20, 30 are fitted into each other. In other words, the successive wound elements are coaxial and stacked around the central wound element 10.

In the embodiment illustrated in FIG. 7, the successive wound elements 10, 20, 30 are shifted relatively to each other so that their bases form a set of indentations along a longitudinal section view.

The successive wound elements of the supercapacitor are intended to be connected together or with wound elements of other adjacent supercapacitors via lids 50 and/or straps.

The different types of the lids 50 will now be described in more detail, which may be used for connecting together the wound elements of a supercapacitor or of different adjacent supercapacitors.

With reference to FIG. 8, a first embodiment of a lid 50 is illustrated, allowing electric connection of two wound elements of a same supercapacitor. The lid 50 has an indented cross-section.

This first lid embodiment 50 is intended to cap a supercapacitor, the wound elements of which have bases shifted relatively to each other. In order to electrically connect wound elements of identical height non-shifted relatively to each other (such as illustrated in FIG. 5), a lid 50 substantially extending in a plane will be used.

Advantageously, the lid 50 is conducting on the whole of its surface, and allows the successive wound elements of a supercapacitor to be placed in electric contact so as to form a common terminal for these wound elements.

The other face of the supercapacitor may be capped with a conducting lid 50 over the whole of its surface in order to electrically connect in parallel the successive wound elements of the supercapacitor.

The other face of the supercapacitor may also be capped with a lid 50 comprising electrically conducting portions, the conducting portions being separated from each other by electrically insulating portions, each electrically conducting portion being respectively in electric contact with a wound element so as to connect the wound elements in series.

Embodiments of lids comprising electrically conducting portions intended to respectively come into electric contact with one of the wound elements are illustrated in FIGS. 9 and 10.

In the embodiment illustrated in FIG. 9, the lid comprises two electrically conducting portions. The first electrically conducting portion S1 is disk-shaped. The second electrically conducting portion S2 is crown-shaped. The electrically conducting portions S1, S2 are separated from each other by crown-shaped electrically insulating portions 60. This lid 50 is intended to cap a supercapacitor comprising two successive wound elements. The first electrically conducting portion S1 is electrically connected to the central wound element 10 of the supercapacitor. The second electrically conducting portion S2 is electrically connected to the peripheral wound element 20 of the supercapacitor.

In the embodiment illustrated in FIG. 10, the lid 50 comprises three electrically conducting portions S1, S2, S3. One of the electrically conducting portions S1 is disk-shaped. The other electrically conducting portions S2, S3 are crown-shaped. The electrically conducting portions S1, S2, S3 are separated from each other by crown-shaped electrically insulating portions 60. The electrically conducting portions S1, S2, S3 are electrically connected to a respective wound element 10, 20, 30. This lid 50 is intended to cap a supercapacitor comprising three successive wound elements.

Of course, the lid 50 may comprise more than three electrically conducting portions, the number of conducting portions depending on the number of wound elements of the supercapacitor.

Depending on the application, the lid 50 may substantially extend in a plane, or have an indented cross-section as illustrated in FIG. 11.

Moreover, the electrically conducting portions may have other shapes. Lids 50 are illustrated in FIGS. 12 and 13, wherein the electrically conducting portions respectively are in the shape of a disk portion. The disk portions are separated from each other by radial insulating portions.

In the embodiment illustrated in FIG. 12, the lid 50 comprises two electrically conduction portions S1, S2 in the shape of a half-disk. Each portion S1 (S2 respectively) is intended to be electrically connected to a respective wound element 10 (20 respectively) of the supercapacitor in an area Z1 (Z2 respectively) of each portion S1 (S2 respectively). This lid 50 is intended to cap a supercapacitor comprising two wound elements.

In the embodiment in FIG. 13, the lid 50 comprises three electrically conducting portions S1, S2, S3 in the shape of a third of a disk. Each portion S1 (S2 respectively, S3 respectively) is electrically connected to a respective wound element 10 (20 respectively, 30 respectively) of the supercapacitor at the solders Z1 (Z2 respectively, Z3 respectively). This lid 50 is intended to cap a supercapacitor comprising three wound elements 10, 20, 30.

Once the supercapacitor is capped with one of the lids 50 described earlier with reference to FIGS. 9-13, the supercapacitor may be connected to adjacent supercapacitor(s) by using electrically conducting connecting straps.

With reference to FIG. 14, an exemplary connecting strap 70 is illustrated. Each connecting strap 70 comprises an electrically conducting portion intended to come into contact respectively with a disk-shaped conducting portion S1, S2, S3 of the lid 50 described with reference to FIG. 13.

More specifically, each strap 70 is substantially flat. The main body of the connecting strap 70 is rectangular. The ends 80 of the strap are of triangular shape. The size and the shape of these ends 80 are provided to be sufficient for coming into contact with a respective conducting portion S1, S2, S3 of the lid 50, without covering the insulating portion separating two conducting portions of the lid 50. Thus, the connecting straps 70 are insulated from each other. By avoiding the contact between the straps 70, the electric insulation of the straps 70 are guaranteed so as to avoid a short-circuit.

With reference to FIG. 15, an alternative connecting strap 70 is illustrated. This connecting strap 70 provides electric connection of two supercapacitors of the type described with reference to FIGS. 9 and 10.

The connecting strap 70 comprises two (or more than two) electrically conducting portions insulated from each other (respectively the ones from the others) by one (or more) electrically insulating portions. Each electrically conducting portion is respectively intended to come into contact with a conducting portion S1, S2, S3 of the lid 50. Each electrically conducting portion comprises a protruding connecting element 90 at the ends 80 of the connecting strap 70. Each of these elements which protrude is intended to come into contact with a respective conducting portion S1, S2, S3 of the lid 50.

With reference to FIG. 16, another embodiment of a connecting strap 70 and of a lid is illustrated. This connecting strap 70 and this lid are adapted to connecting two supercapacitors each comprising three wound elements. Of course, this lid and this strap may comprise more than three electrically conducting portions in the case when the supercapacitors comprise more than three wound elements.

The connecting strap 70 is substantially flat. The lid comprises electrically insulating areas extending at the contact surface between the lid and the strap. These electrically insulating areas are positioned so that each conducting portion of the strap is electrically in contact with a single conducting portion of the lid. With this, the wound elements of the thereby connected supercapacitors may be electrically connected two by two.

Advantageously, the supercapacitor may be dissymmetrical, i.e. the electrodes of the different complexes may be different in terms of length and/or thickness and/or nature of the material making them up.

By working with a dissymmetrical supercapacitor, it is possible to optimize:
the capacitance of the supercapacitor on the one hand, and
the aging of the supercapacitor on the other hand because of better control of the potential of each electrode.

The dissymmetry of the supercapacitor may for example be obtained by varying the thickness of the electrodes of the wound elements, so that the positive and negative electrodes of each wound element have different volumes.

The dissymmetry of the supercapacitor may also be obtained by varying the thicknesses and/or lengths of the electrodes of the wound elements.

The dissymmetry may also be obtained by varying the nature of the constituents of the electrodes of the wound elements. For example, in an embodiment, the electrodes of a wound element are of identical thickness but are made up of different materials so as to have different faradic densities.

The supercapacitors may have different shapes, for example the supercapacitors may be cylindrical.

The supercapacitors may also have a hexagonal or triangular, or octagonal, or rectangular shape, or further elliptical shape, orthogonally to the winding axis. With this, the dead volume may be limited between two adjacent supercapacitors. The angles of the wound elements may be non-protruding.

General Case Allowing Demonstration in the Gain in Volume on a Co-Wound System

As described earlier, the supercapacitor according to the invention allows reduction of the volume associated with the series or parallel electric connection of two supercapacitors as compared with the modules of the prior art.

Such a module of the prior art is illustrated in FIG. 17. The module comprises two supercapacitors 120. Each supercapacitor 120 comprises a cylindrical wound element comprising two electrodes and one separator. A portion 180 of the electrodes juts out outwards. The supercapacitors are connected in series by means of a connecting strap 170 and of lids 180. Each lid 180 caps a respective supercapacitor 120 so as to be electrically connected to the latter at the electrode portion 190 jutting out outwards. Each lid 180 is in contact by soldering with a strap 70, so as to electrically connect both supercapacitors 120 in series.

In order to demonstrate the gain in volume of the supercapacitor according to the invention as compared with the module of the prior art, the following parameters are required:
C: capacitance to be obtained (F)
$\xi$: faradic density (F/cm$^3$)
h: activated height (cm)
H: total height (cm)
e: thickness of the wound separator/electrode/collector/electrode/separator/electrode/collector/electrode (cm)
$\varnothing_{int}$: inner diameter around which begins the winding ($\varnothing_{int} > 0$) (cm)

The output data are the following:
k: number of turns
$\varnothing_{ext}$: outer diameter of a winding of capacitance C comprising k turns (cm)
$C_n$: capacitance of n parallel nested windings (F)
$\varnothing_{ext\,n}$: Outer Diameter of the Capacitor $C_n$ (Cm)
$V_n$: volume of the n-nested capacitor of value $C_n$ (cm$^3$)
V: volume of n capacitors of value C in parallel (cm$^3$)
Formulae:

$$C = \xi(he/2)\pi k(\varnothing_{int} + ke)$$

$$\varnothing_{ext} = \varnothing_{int} + 2ke$$

$$k = \frac{-\varnothing_{int} + \sqrt{\varnothing_{int}^2 + \frac{8C}{\xi\pi h}}}{2e}$$

$$\varnothing_{ext} = \sqrt{\varnothing_{int}^2 + \frac{8C}{\xi\pi h}}$$

$$C_n = nC$$

$$V_n = \varnothing_{ext\,n}^2 H = \left(\varnothing_{int}^2 + \frac{8nC}{\xi\pi h}\right)H$$

$$V = n\varnothing_{ext}^2 H = n\left(\varnothing_{int}^2 + \frac{8C}{\xi\pi h}\right)H$$

Numerical Application of the Formulae Established Earlier:

In the following numerical examples, the value of capacitance of each winding is assumed to be identical, which in practice means that windings of larger diameters have smaller thickness than the windings of smaller diameters, the winding length being identical for each capacitor.

Numerical Example 1

C=600 F $\xi$=30 F/cm$^3$ h=8 cm H=10 cm
e=0.05 cm $\varnothing_{int}$=2.5 cm

FIG. 18 shows the volume V of n wound elements associated as a module and the equivalent of a single supercapacitor according to the invention containing n co-wound elements $V_n$. The volumes are expressed in cm$^3$ (ordinates on the left). %$\Delta$V represents the percent gain between a co-wound element and associated elements (ordinate axis on the right).

Numerical Example 2

C=2600 F $\xi$=30 F/cm$^3$ h=8 cm H=10 cm
e=0.05 cm $\varnothing_{int}$=2.5 cm

FIG. 19 shows the volume V of n wound elements associated as a module and the equivalent of a single supercapacitor according to the invention containing n co-wound elements $V_n$. The volumes are expressed in cm³ (ordinates on the left). %ΔV represents the percent gain between a co-wound element and associated elements (ordinate axis on the right).

Numerical Example 3

C=5000 F ξ=30 F/cm³ h=8 cm H=10 cm
e=0.05 cm $\varnothing_{int}$=2.5 cm
FIG. 20 shows the volume V of n wound elements associated as a module and the equivalent of a single supercapacitor according to the invention containing n co-wound elements $V_n$. The volumes are expressed in cm³ (ordinates on the left). %ΔV represents the percent gain between a co-wound element and associated elements (ordinate axis on the right).
Result:
FIGS. 18, 19, 20 show that the gain in volume is obtained regardless of the number of co-wound elements and of the initial capacitance used.

General Case Allowing Demonstration of the Gain in Mass on a Co-Wound System

As described earlier, with the supercapacitor according to the invention, it is possible to reduce the mass associated with the series or parallel electric connection of two supercapacitors as compared with the modules of the prior art.

In order to demonstrate the gain in mass of the supercapacitor according to the invention as compared with the module of the prior art, the following parameters are required:
$e_c$: thickness of the lid (cm)
$e_t$: thickness of the tube (cm)
$m_u^C$: mass of the capacitor C (g)
d: specific gravity of the material of the tube and of the lid (g/cm³)
The output data are the following:
$m_c^C$: mass of the lid of a capacitor of value C (g)
$m_t^C$: mass of the tube of a capacitor of value C (g)
m: total mass of n capacitors of value C in parallel (g)
$m_n$: total mass of the n-nested capacitor of value $C_n$ (g)
Formulae:

$$m_c^C = \pi \varnothing_{ext}^2 e_c d$$

$$m_t^C = \pi \varnothing_{ext} e_t H d$$

$$m = n(m_u^C + 2m_c^C + m_t^C)$$

$$m_n = m_u^{Cn} + 2m_c^{Cn} + m_t^{Cn}$$

Numerical Application of the Formulae Established Earlier:
$e_c$=0.4 cm $e_t$=0.05 cm
d (specific gravity of aluminium)=2.7 g/cm³
$m_u^{600F}$=75 g $m_u^{2600F}$=325 g Numerical Example 1

$e_c$=0.4 cm $e_t$=0.05 cm
d (specific gravity of aluminium)=2.7 g/cm³
$m_u^{600F}$=75 g
FIG. 21 shows the mass m of n wound elements associated as a module and the equivalent of a single supercapacitor according to the invention containing n co-wound elements $m_n$. The masses are expressed in grams (ordinates on the left). %Δm represents the percent gain in mass between a co-wound element and associated elements (axis of ordinates on the right).

Numerical Example 2

$e_c$=0.4 cm $e_t$=0.05 cm
d (specific gravity of aluminium)=2.7 g/cm³
$m_u^{2600F}$=325 g
FIG. 22 shows the mass m of n wound elements associated as a module and the equivalent of a single supercapacitor according to the invention containing n co-wound elements $m_n$. The masses are expressed in grams (ordinates on the left). %Δm represents the percent gain in mass between a co-wound element and associated elements (axis of ordinates on the right).

Numerical Example 3

$e_c$=0.4 cm $e_t$=0.05 cm
d (specific gravity of aluminium)=2.7 g/cm³
$m_u^{5000F}$=650 g
FIG. 23 shows the mass m of n elements associated as a module and the equivalent of a single supercapacitor according to the invention containing n co-wound elements $m_n$. The masses are expressed in grams (ordinates on the left). %Δm represents the percent gain in mass between a co-wound element and associated elements (axis of ordinates on the right).
Result:
FIGS. 21, 22, 23 show that the gain in mass is obtained regardless of the number of co-wound elements and of the initial capacitance used. This gain in mass does not take into account the consequent gain in terms of extra-element connection technology (connecting straps, lid, etc.) which further increases the obtained gain in terms of mass.

CONCLUSION

Regardless of the number of co-wound elements, the simultaneous gain in mass and volume exists relatively to a series or parallel assembly of several wound elements as proposed in the prior art.

This novel system therefore corresponds to a significant increase in bulk and mass energy density.

It is important to specify that the mass of each electrode, the thickness of the coating, of the collector, the type of carbon and the overall width may be different, as shown by the different descriptive diagrams.

Among the examples which we have mentioned, we have taken the simplest cases and they may easily be multiplied over and over again. Regardless of the type of arrangement, the gain in mass and in volume is targeted in an advantageous way. This gain may also be accomplished in terms of voltage, according to arrangements of the type described in FIG. 8.

Each electrode may be symmetrical (the simplest and generally applied case) relatively to a specific collector so as to double the amount of active material of the thereby formed capacitance and to drastically increase the bulk capacitance of the assembly, and therefore the maximum admissible energy. The case of dissymmetry should not be set aside:
- case of windings with different capacitances in the same element,
- case of different active materials (for example porosity of different carbons)
- combination of multitrack co-windings, i.e. a supercapacitor, such that it comprises at least two juxtaposed complexes spaced apart by a distance d and at least one common complex facing both juxtaposed complexes and separated from the latter by at least one separator, the separator and the complexes being wound together in turns in order to form a wound element (object of a separate patent application) with the multicoil system, object of the present application.

In FIGS. 24-28 different examples of circuits are illustrated which may be achieved with the supercapacitor according to the invention.

Figure 24:
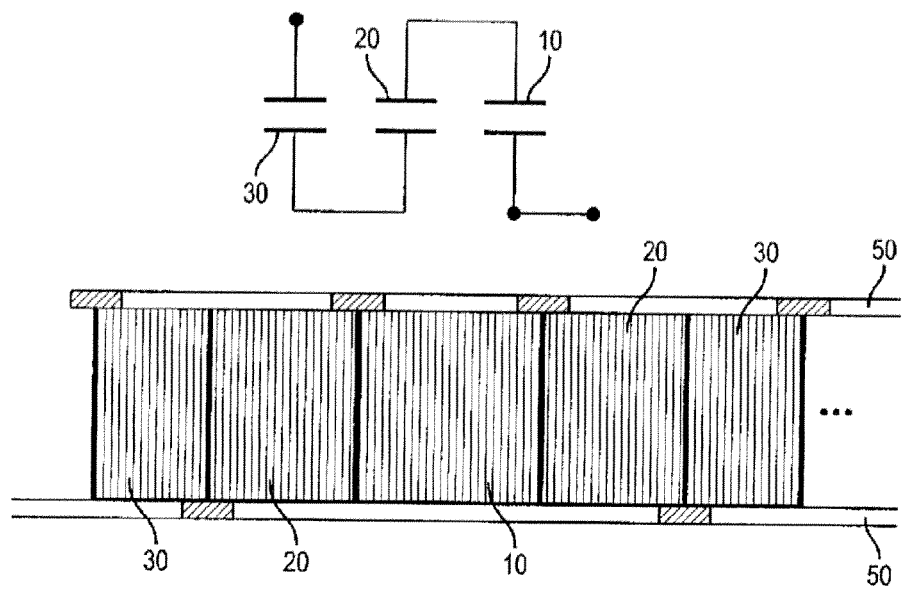

With reference to FIG. 24, an exemplary circuit is illustrated in which, with the succession of wound elements 10, 20, 30 (each forming a supercapacitor) connected in series by means of a particular type of lid comprising different conducting and insulating areas, a series electric connection of the different wound elements may be obtained.

Figure 25:
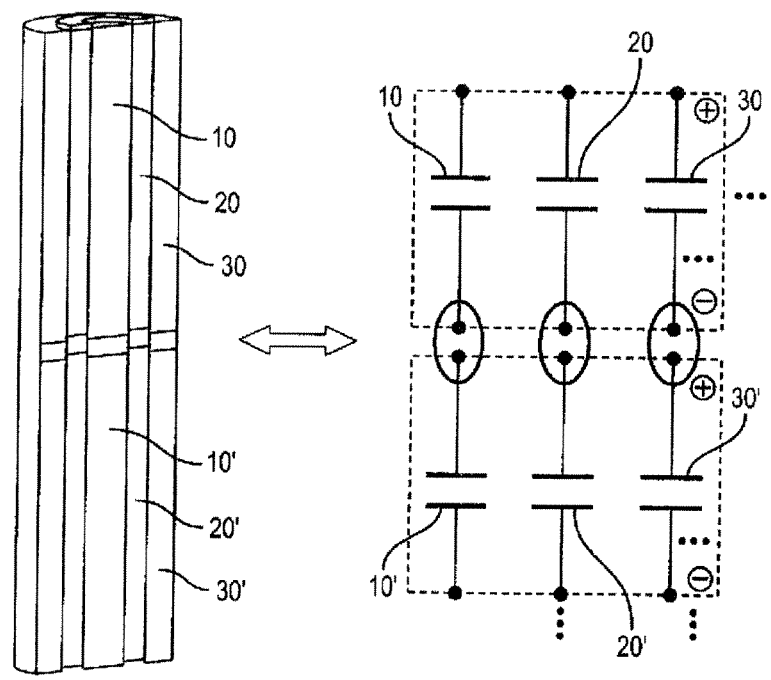

With reference to FIG. 25, another exemplary circuit is illustrated in which each wound element 10, 20, 30 of a first supercapacitor is connected in series with a wound element 10', 20', 30' of another supercapacitor, the different wound elements of the first supercapacitor being connected in parallel.

More specifically, the bases of each supercapacitor are capped with lids (of the type illustrated in FIG. 10) comprising three electrically conducting portions S1, S2, S3 (S1 is disk-shaped and S2n S3 are crown-shaped) separated from each other by electrically insulating portions 60 (crown-shaped). Both supercapacitors are then stacked so that:
  the central wound element 10 of the first supercapacitor is connected in series with the central wound element 10' of the second supercapacitor
  the peripheral wound element 30 of the first supercapacitor is connected in series with the peripheral wound element 30' of the second supercapacitor, and
  the intermediate wound element 20 of the first supercapacitor is connected in series with the intermediate wound element 20' of the second supercapacitor.

Figure 26:
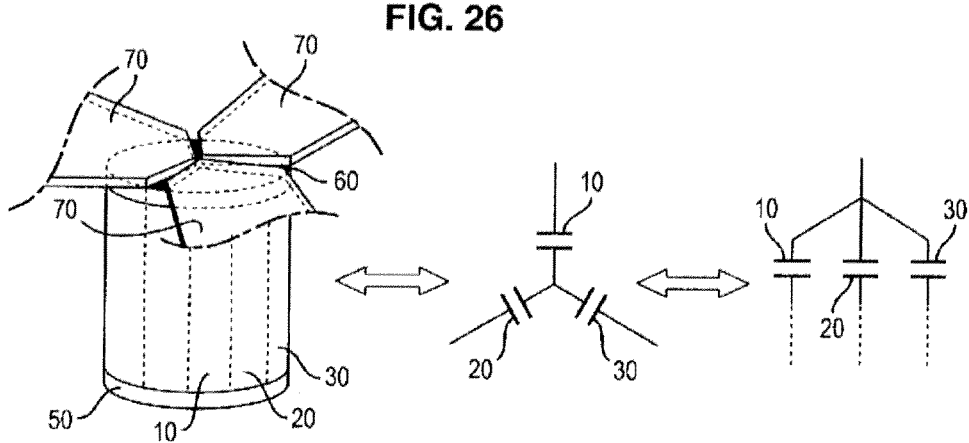

The advantage of this circuit is that the electric connection of both supercapacitors does not require the use of a connecting strap. It is quite obvious that in the case of the electric connection of two adjacent supercapacitors, the same circuit may be achieved by using particular connecting straps (such as the connecting strap illustrated in FIG. 16), as illustrated in FIG. 26.

Figure 27:
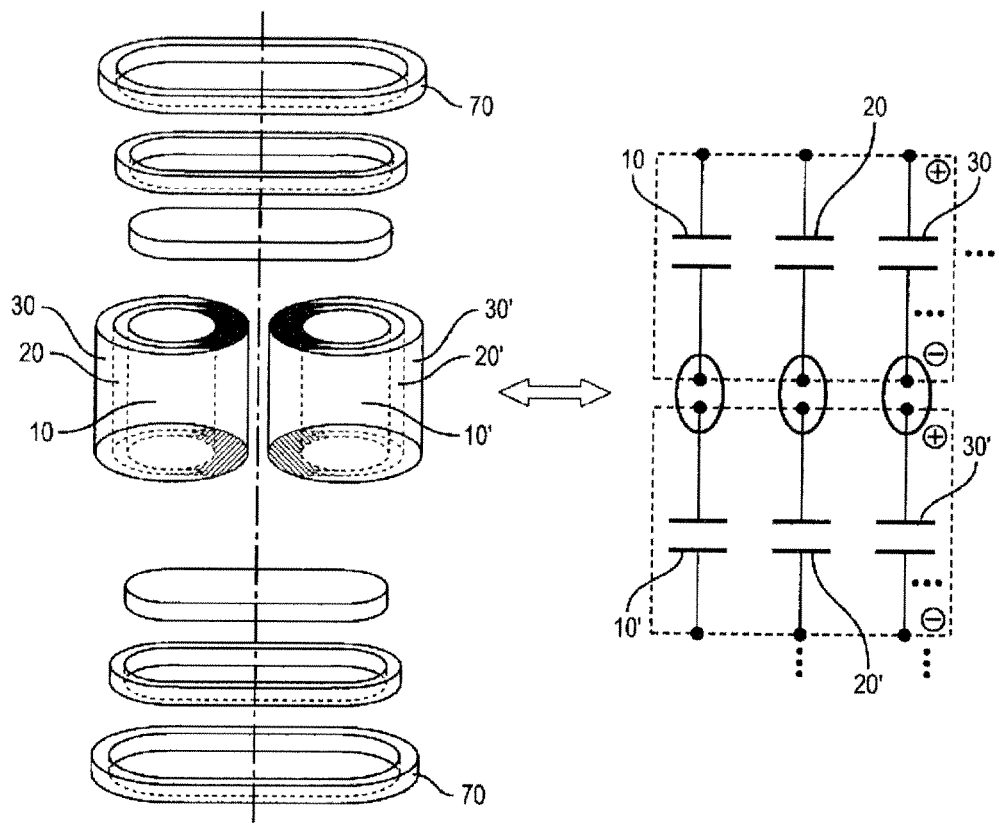

With reference to FIG. 27, an embodiment is illustrated in which the successive wound elements of a supercapacitor are connected so as to form a star circuit.

More specifically, the lower base of the supercapacitor is capped with a conducting lid over the whole of its surface, and the upper base of the supercapacitor is capped with a lid of the type illustrated in FIG. 13 comprising three disk portions connected to a respective wound element of the supercapacitor. Connecting straps of the type described with reference to FIG. 14 are used for connecting the wound elements of the supercapacitor to the wound elements of other adjacent supercapacitors.

With reference to FIG. 28, an exemplary circuit is finally illustrated in which two supercapacitors are electrically connected in series, the wound elements of each supercapacitor being connected in parallel.

More specifically, the bases of each supercapacitor are capped with conducting lids over the whole of their surface and are connected through conducting connecting straps over the whole of their surface.

The supercapacitors according to the invention therefore allow a large number of electric circuits to be made, much more ergonomically than the supercapacitors of the prior art.

The reader will have understood that many modifications may be made to the supercapacitor described earlier without materially departing from the novel teachings and advantages described herein.

Therefore, all the modifications of this type are intended to be incorporated within the scope of the supercapacitor as defined in the appended claims.

This type of element design may also find all its application for batteries or battery cells of any nature (Li-ion, lithium polymer, Ni—Cd, Ni—MH), or further even for fuel cells.

The supercapacitor according to the invention has many advantages:
  for a supercapacitor according to the invention, with bulk energy identical with that of two standard supercapacitors, it is possible to apply a lower voltage and therefore very strongly limit the generation of gas and therefore increase the lifetime in a very advantageous way,
  the internal volume of a supercapacitor according to the invention may advantageously be greater, per circuit, than the internal volume of two associated standard supercapacitors. In this case, the lifetime will also be increased.

Finally, in a module comprising a plurality of supercapacitors connected to each other, at least half of the series resistance of the module is a connection technology resistance between the coils and the lids. In a module comprising a plurality of supercapacitors according to the invention, the series resistance of the module is strongly reduced, due to the reduction in the number of junctions required between lid and coil as compared with a module comprising a plurality of standard supercapacitors.

The invention claimed is:

1. A supercapacitor with a double electrochemical layer, comprising at least two complexes and at least one separator between the at least two complexes, each complex including a current collector and at least one electrode, wherein the supercapacitor further comprises at least one other complex and at least one other separator, the complexes and the separators being wound together in turns along a longitudinal axis z of the supercapacitor:
  the at least one other complex being successive to one of the at least two complexes in order to form two successive complexes spaced across a distance q circumferential to the longitudinal axis z of the supercapacitor, and
  the at least one other separator being positioned on a face of the complex facing the successive complexes so that said complex extends between the separator and the at least one other separator,
  so as to form at least two successive wound elements, these successive wound elements being separated by an electrically insulating space.

2. The supercapacitor according to claim 1, wherein the complex facing the two successive complexes is common to both successive wound elements.

3. The supercapacitor according to claim 1, wherein the supercapacitor further comprises at least one second other complex, the first and second complexes (2, 3), the other complex (1), the second other complex, the separator and the other separator being wound together in turns around the wound element so as to form the two successive wound elements.

4. The supercapacitor according to claim 1, wherein the electronically insulating space is formed by a reinforcement formed with at least one turn of dielectric insulating material.

5. The supercapacitor according to claim 1, wherein the electrically insulating space is formed by the distance q between the successive complexes.

6. The supercapacitor according to claim 1, wherein the distance q is at least equal to 1 mm.

7. The supercapacitor according claim 1, wherein the separators are continuous so that the supercapacitor includes a single separator common to the different wound elements and acting as a reinforcement between the different wound elements.

8. The supercapacitor according to claim 1, wherein the height of each wound element is constant.

9. The supercapacitor according to claim 1, wherein the wound elements have different heights.

10. The supercapacitor according to claim 1, wherein the wound elements are shifted relatively to each other along their longitudinal axis z.

11. The supercapacitor according to claim 1, wherein the wound elements are electrically connected through a first conducting lid on the whole of its surface, said first conducting lid being positioned on one of the base faces of the wound elements.

12. The supercapacitor according to claim 11, wherein the first conducting lid has an indented cross-section.

13. The supercapacitor according to claim 11, wherein the first conducting lid extends in a plane.

14. The supercapacitor according to claim 11, wherein the wound elements are electrically connected through a second conducting lid over the whole of its surface, said second conducting lid being positioned on the other one of the base faces of the wound elements so as to connect the wound elements in parallel.

15. The supercapacitor according to claim 11, wherein the wound elements are electrically connected through a second conducting lid comprising electrically conducting portions the electrically conducting portions being separated from each other by electrically insulating portions, each electrical conducting portion being respectively in electric contact with a wound element so as to connect the wound elements in series.

16. The supercapacitor according to claim 15, wherein one of the electrically conducting portions is disk-shaped, and the other electrically conducting portions are crown-shaped, the electrically conducting portions being separated from each other by crown-shaped electrically insulating portions.

17. The supercapacitor according to claim 14, wherein the second conducting lid extends in a plane.

18. The supercapacitor according to claim 14, wherein the second conducting lid has an indented cross-section.

19. The supercapacitor according to claim 15, wherein each electrically conducting portion is in the shape of a disk portion, the electrically conducting portions being separated from each other by radial electrically insulating portions.

20. The supercapacitor a to claim 19, wherein the supercapacitor is connected to at least one other supercapacitor of the same type through at least two connecting straps each connecting strap comprising an electrically conducting portion intended to respectively come into contact with an electrically conducting portion of the conducting lid.

21. The supercapacitor according to claim 15, wherein the supercapacitor is electrically connected to another supercapacitor of the same type through at least one connecting strap comprising at least two electrically conducting portions, insulated from each other by at least one electrically insulating portion, said electrically conducting portions being intended to come into contact respectively with an electrically conducting portion of the conducting lid.

22. The supercapacitor according to claim 21, wherein the connecting strap is flat and wherein the conducting lid comprises electrically insulating areas extending at the contact surface between the conducting lid and the connecting strap, the electrically insulating areas being positioned so that each electrically conducting portion of the connecting strap is electrically in contact with a single electrically conducting portion of the conducting lid.

23. The supercapacitor according to claim 21, wherein each electrically conducting portion comprises a protruding connecting element at the ends of the connecting strap, each protruding element being intended to come into contact with a respective electrically conducting portion of the conducting lid.

24. The supercapacitor according to claim 4, wherein the height of the reinforcement is comprised between the height of active material of the first wound element and the total height of said first wound element.

25. The supercapacitor according to claim 1, wherein the electrodes of the complexes of the wound elements are of different lengths.

26. The supercapacitor according to claim 1, wherein the thicknesses of the electrodes of the complexes of the wound elements are different.

27. The supercapacitor according to claim 1, wherein the electrodes of the complexes of the wound elements are of different natures.

28. The supercapacitor according to claim 1, wherein the base of the wound elements orthogonal to the longitudinal axis z is of circular shape.

29. The supercapacitor according to claim 1, wherein the base of the wound elements orthogonal to the longitudinal axis z is of hexagonal shape.

30. The supercapacitor according to claim 1, wherein the base of the wound elements orthogonal to the longitudinal axis z is of triangular shape.

31. The supercapacitor according to claim 1, wherein the base of the wound elements orthogonal to the longitudinal axis z is of octagonal shape.

32. The supercapacitor according to claim 1, wherein the base of the wound elements orthogonal to the longitudinal axis z is of rectangular shape.

33. The supercapacitor according to claim 28, wherein the angles of the wound elements are non-protruding.

34. The supercapacitor according to claim 1, wherein the base of the wound elements orthogonal to the winding axis is of elliptical shape.

35. A module comprising a casing in which is positioned at least one supercapacitor according to any one of claims 1 to 34.

36. The module according to claim 35, further comprising at least one standard supercapacitor including a cylindrical wound element including at least two electrodes and at least one separator wound together in turns in order to form a wound element positioned in a casing and conducting lids intended for closing the casing, said standard supercapacitor being electrically connected to the supercapacitor via at least one connecting strap.

* * * * *

UNITED STATES PATENT AND TRADEMARK OFFICE
CERTIFICATE OF CORRECTION

PATENT NO. : 8,749,952 B2
APPLICATION NO. : 12/918053
DATED : June 10, 2014
INVENTOR(S) : Philippe Azais, Olivier Caumont and Jean-Michel Depond Page 1 of 1

It is certified that error appears in the above-identified patent and that said Letters Patent is hereby corrected as shown below:

In the Claims

Column 15, Claim 15, line 30, please delete "electrical" and insert --electrically--.

Column 15, Claim 20, line 47, please delete "a" and insert --according--.

Signed and Sealed this
Fourth Day of November, 2014

Michelle K. Lee
*Deputy Director of the United States Patent and Trademark Office*